No. 831,956. PATENTED SEPT. 25, 1906.
R. JONAS.
GEAR FOR DIRECTING TRAINS OF WAGONS.
APPLICATION FILED APR. 5, 1906.

2 SHEETS—SHEET 1.

WITNESSES INVENTOR
W. P. Burke Richard Jonas
J. H. Saunders BY
ATTYS

THE NORRIS PETERS CO., WASHINGTON, D. C.

No. 831,956. PATENTED SEPT. 25, 1906.
R. JONAS.
GEAR FOR DIRECTING TRAINS OF WAGONS.
APPLICATION FILED APR. 5, 1906.

2 SHEETS—SHEET 2.

WITNESSES
W. P. Burke
J. H. Saunders

INVENTOR
Richard Jonas
BY Richardson
ATTYS.

THE NORRIS PETERS CO., WASHINGTON, D. C.

UNITED STATES PATENT OFFICE.

RICHARD JONAS, OF BERLIN, GERMANY.

GEAR FOR DIRECTING TRAINS OF WAGONS.

No. 831,956.　　　　Specification of Letters Patent.　　　　Patented Sept. 25, 1906.

Application filed April 5, 1906. Serial No. 310,187.

*To all whom it may concern:*

Be it known that I, RICHARD JONAS, a subject of the King of Prussia, German Emperor, residing at Berlin, Germany, have invented new and useful Improvements in Gear for Directing Trains of Wagons, of which the following is a specification.

My invention relates to improvements in gear for directing trains of wagons, especially in the invention described in United States Letters Patent No. 798,189, in which a composite vehicle is disclosed comprising two single-axled wagons each of which can be set relatively to a longitudinally-running bar which pivotally unites them, while the various composite vehicles are connected together with simple turning couplings.

The present improvement consists in the provision of a directing-gear between the two single-axled wagons constituting a composite vehicle for the purpose of enabling either of the wagons to be turned by hand at an angle to the longitudinal bar coupled with the wagon.

The new gear is particularly serviceable for adjusting the front axle when it is desired that the train of wagons shall travel backward in a curve while the locomotive or driving-wagon pushes from behind.

The gear also facilitates coupling of the composite vehicles with each other and with the driving-wagon, since when there is no track the couplings between the composite vehicles rarely lie in line.

One form of the invention is illustrated in the accompanying drawings, in which—

Figure 1:
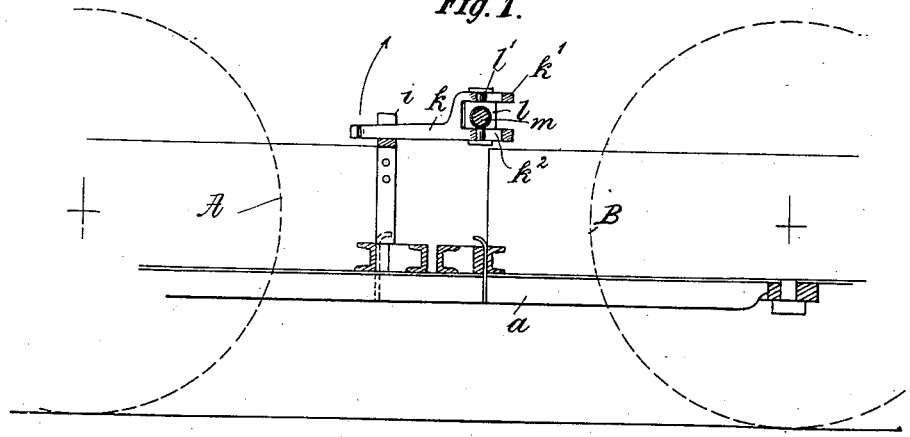
Figure 2:
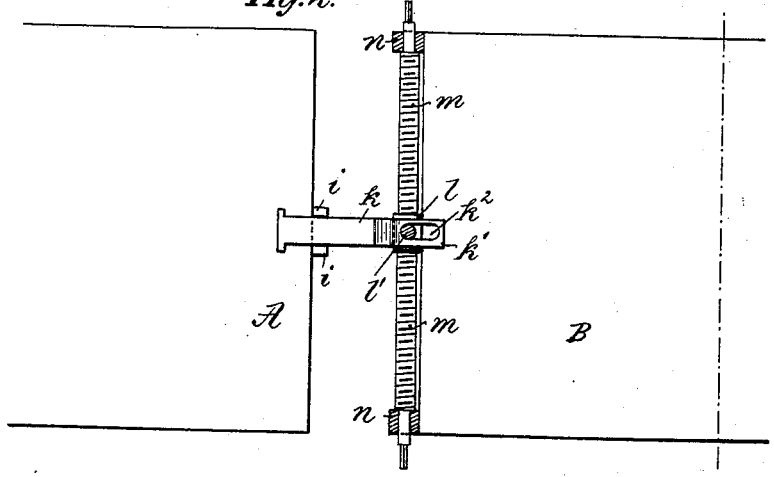
Figure 3:
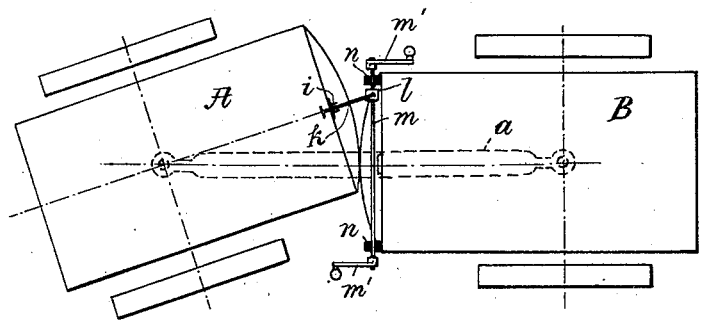
Figure 4:
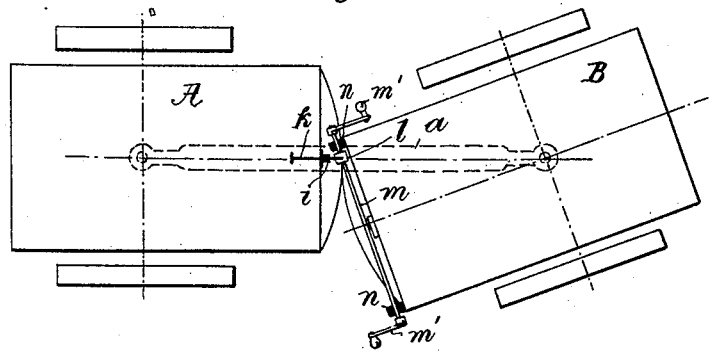

Figure 1 is a longitudinal section of the gear and portions of the connected wagons. Fig. 2 is a sectional plan of Fig. 1. Fig. 3 is a sectional diagrammatic plan of a composite vehicle fitted with the new gear drawn to a smaller scale. Fig. 4 is a like view, the wagons being turned into a different position relatively to one another.

Referring to Figs. 1 and 2, $i$ is a vertical fork or crutch secured to the body of the one wagon A, and in it there rests the tail end of a bar $k$, having a bifurcated head $k'$. The latter embraces a nut $l$, having trunnions $l'$, which enter slots $k^2$ in the head $k'$. The nut $l$ works on a screw-spindle $m$, mounted in the lugs or brackets $n$, projecting from the body of the second wagon B. $m'$ $m'$ are crank-handles fitting onto the ends of the spindle $m$ for turning the same from both sides of the wagon. The nut $l$ in riding along the spindle $m$ carries with it the bar $k$, which, though it can be raised vertically in the crutch $i$, cannot turn horizontally in it. The two wagon-bodies therefore move in a horizontal plane relatively to each other. The alteration in the distance between the parts $i$ and $l$, owing to this relative motion, is allowed for by the bar $k$ being capable of sliding in the crutch $i$ and by the provision of the slots $k^2$. The axle of the wagon fitted with the crutch $i$ or of the one furnished with the spindle $m$ is employed for directing the train, depending on the direction in which it is to travel. This can be done by the body of the wagon in question being coupled with the longitudinal connecting-bar $a$ by means of the device disclosed in the said Letters Patent No. 798,189, whereby the free axle is compelled by the directing-gear to turn through an angle relatively to the longitudinal bar $a$. The two cases are illustrated in Figs. 3 and 4.

In ordinary traveling—that is, when the composite vehicles are being drawn by the driving-wagon and are to be directed in a curve—the fixed position given to each two axles relatively to each other would be maintained, owing to self-locking of the spindle, so that it would be impossible for the succeeding wagon to follow the course of the preceding. For this reason the directing-gear must be disengaged, which is done by simply raising the bar $k$ out of the crutch $i$, whereby the bar $k$, with nut $l$, will turn back on the spindle $m$. After slight lateral motion the bar $k$, by reason of its weight, will hang on the trunnions $l'$ before the front wall of the wagon-body B, which carries the spindle.

Having thus described my invention, what I claim as new, and desire to secure by Letters Patent, is—

1. In combination, a composite vehicle comprising two single-axled wagons pivotally connected together by a longitudinal member, a transverse rotatable screw-spindle mounted on the one wagon, a nut on the spindle, a bar having a bifurcated head embracing the nut and preventing it from turning, and means for connecting a bar with the other wagon with capability of sliding in longitudinal direction, substantially as described.

2. In combination, a composite vehicle comprising two single-axled wagons pivotally connected together by a longitudinal member, a transverse rotatable screw-spindle mounted on the one wagon, a nut on the spindle, a bar having a bifurcated head embracing the nut and preventing it from turning, and a vertical crutch secured to the other wagon and adapted to receive the tail of the bar, substantially as described.

3. In combination, a composite vehicle comprising two single-axled wagons pivotally connected together by a longitudinal member, a transverse rotatable screw-spindle mounted on the one wagon, a trunnioned nut on the spindle, a bar having a bifurcated slotted head embracing the trunnioned nut, and a vertical crutch secured to the other wagon and adapted to receive the tail of the bar, substantially as described.

In testimony whereof I have signed my name to this specification in the presence of two subscribing witnesses.

RICHARD JONAS.

Witnesses:
   HENRY HASPER,
   WOLDEMAR HAUPT.